March 15, 1949.　　　A. P. WATERSON　　　2,464,626
PILOT OPERATED SERVO VALVE
Filed Oct. 22, 1947　　　2 Sheets-Sheet 1
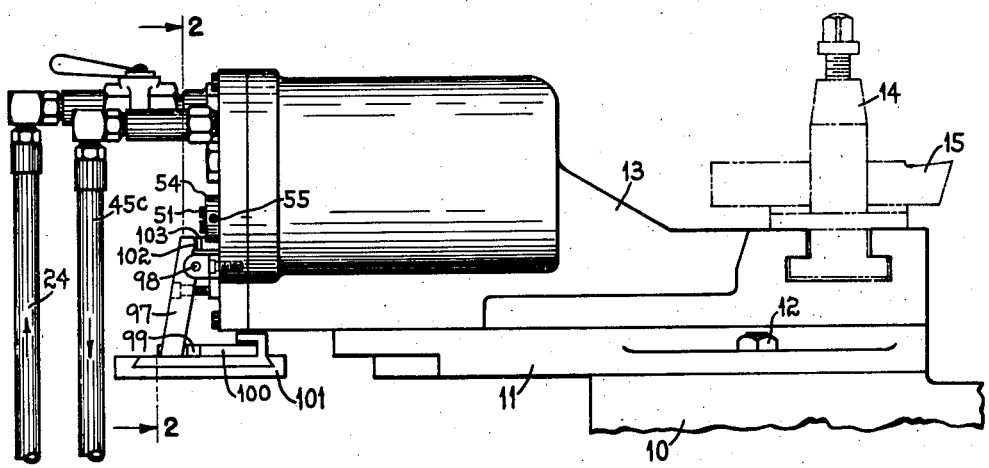
FIG. 1
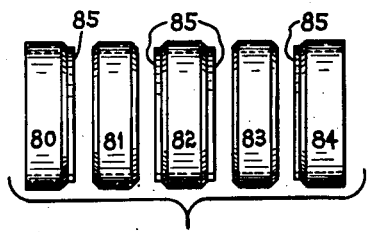
FIG. 4
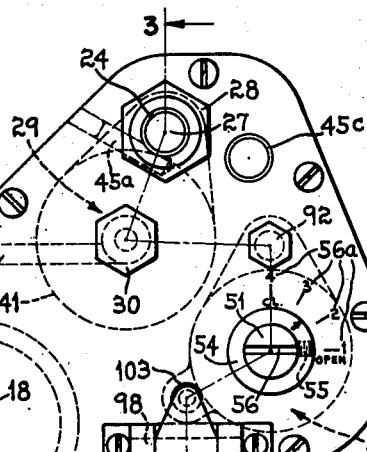
FIG. 2
FIG. 6
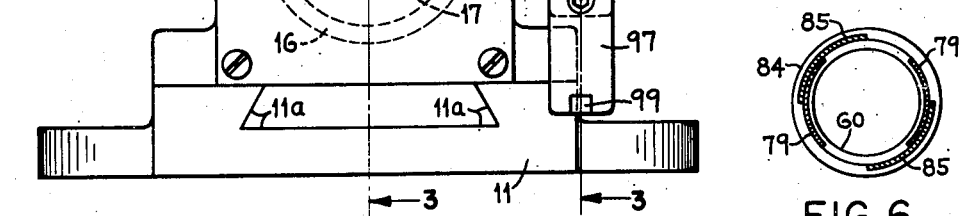
FIG. 5
INVENTOR.
ARTHUR P. WATERSON
BY
ATTORNEYS.

March 15, 1949.  A. P. WATERSON  2,464,626
PILOT OPERATED SERVO VALVE
Filed Oct. 22, 1947  2 Sheets-Sheet 2
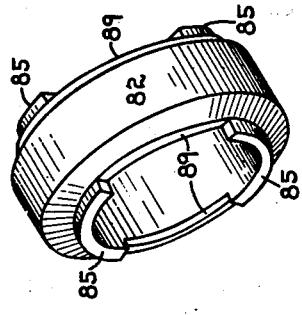
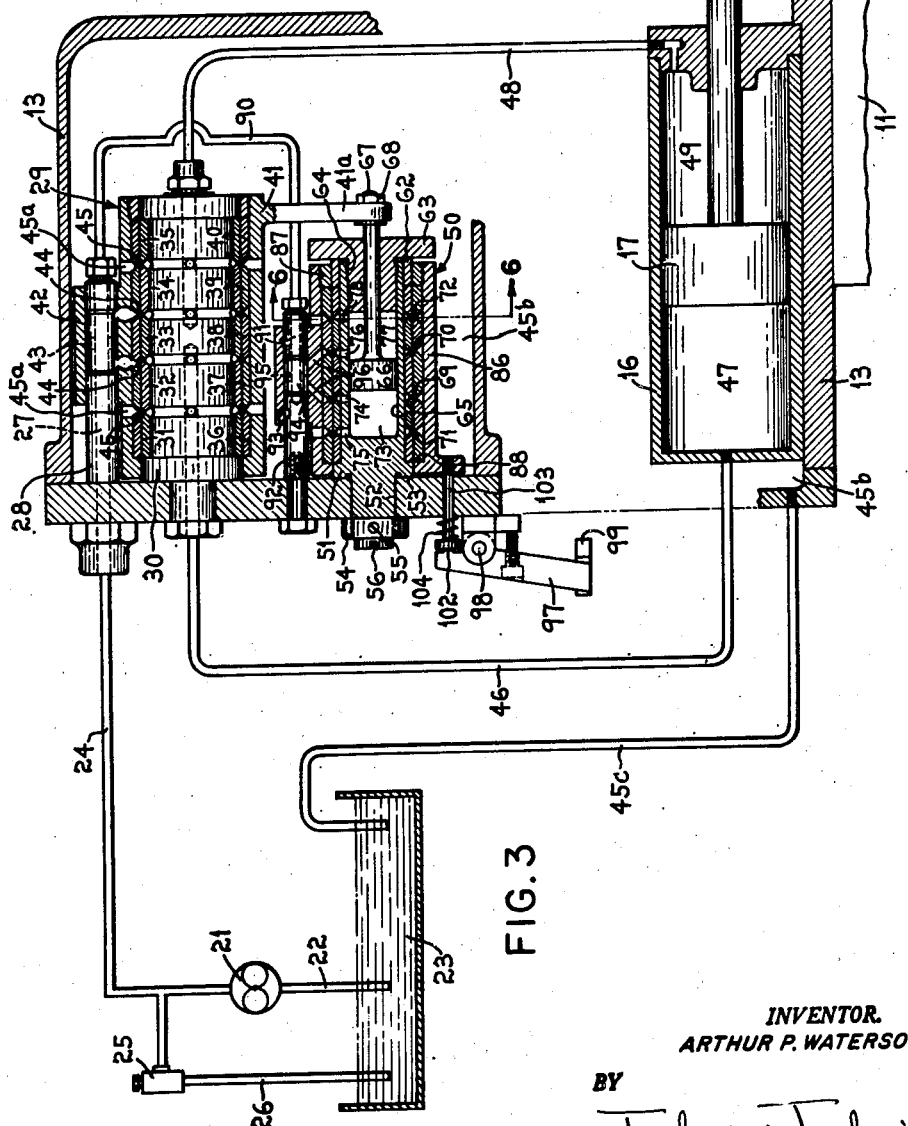
INVENTOR.
ARTHUR P. WATERSON
BY
Toulmin & Toulmin
ATTORNEYS.

Patented Mar. 15, 1949

2,464,626

UNITED STATES PATENT OFFICE 2,464,626

PILOT OPERATED SERVO VALVE

Arthur P. Waterson, Tulsa, Okla., assignor to The R. K. Le Blond Machine Tool Company, Cincinnati, Ohio, a corporation of Delaware Application October 22, 1947, Serial No. 781,436

9 Claims. (Cl. 121—45)

This invention pertains to improvements in hydraulic tracer control valve mechanism, and is particularly related to improvements in pilot operated servo valves for controlling the movements of machine tool elements.

One of the objects of this invention is to provide a pilot operated servo tracer valve in which the contact between tracer and template is reduced to a minimum of pressure.

Still another object of this invention is to provide improved sensitivity for a pilot operated servo tracer valve.

Still another object of this invention is to provide a pilot operated servo valve which may be readily set for the desired degree of accuracy and the desired size of actuating cylinder to be used therewith in controlling the movements of a machine member.

Further features and advantages of this invention will appear from a detailed description of the drawings in which:

Figure 1 is a side elevation of a typical tracer control duplicating attachment to which this invention is particularly well adapted.

Figure 2 is a front end view of the attachment of Figure 1 indicated by the line 2—2 of Figure 1.

Figure 3 is a diagrammatic section of the hydraulic valve system indicated by the line 3—3 in Figure 2.

Figure 4 is an exploded side view of the series of outside valve port forming collars shown in Figure 3.

Figure 5 is a similar view to Figure 4 of the mating inside set of port forming collars for the valve mechanism.

Figure 6 is an enlarged sectional view through the pilot valve on the line 6—6 of Figure 3.

Figure 7 is a perspective view of one of the port forming collars of the pilot valve.

For exemplary purposes, this invention is shown applied to a duplicating attachment adapted to be used with a machine tool such as an engine lathe having a cross slide 10 upon which is mounted the duplicator attachment swivel base 11 by the usual mounting screws 12, commonly used in connection with lathes. On suitable guideways 11a formed in the swivel base 11 is mounted to slide to and from the work, the tool slide 13 having the usual tool post 14 and cutting tool 15 as commonly used in a lathe.

The tool slide is reciprocated in tracer controlled movements on the swivel base 11 by means of a fluid pressure cylinder 16 rigidly fixed to the tool slide 13 by suitable means and having a piston 17 and piston rod 18 connected through a suitable bracket 19 bolted to the swivel base 11 by suitable screws 20 so that upon application of fluid pressure in the cylinder 16 the tool slide 13 may be relatively reciprocated on the swivel base 11.

A source of fluid pressure is provided by a fluid pressure pump 21 which receives a supply of fluid through a suction line 22 from the fluid reservoir 23 and delivers fluid under pressure to the pressure supply line 24 in which is connected a pressure relief valve 25 discharging through a drain line 26 into the fluid reservoir 23 to maintain a predetermined desired operating pressure in the pressure supply line 24. The pressure supply line 24 is connected to the pressure supply passageway 27 in the supply spindle 28 of the main four-way reversing control valve indicated generally at 29 which valve 29 may preferably be of a type such as shown in applicant's copending applications Serial No. 675,523, filed June 10, 1946, and Serial No. 743,669, filed April 24, 1947. Since the details of construction of the main control valve 29 form no specific part of applicant's instant invention, it is sufficient to state that there is provided a valve stem 30 which is rigidly fixed to the tool slide 13 and has provided thereon a series of inner port forming collars 31, 32, 33, 34, and 35 which cooperate with mating port forming collars 36, 37, 38, 39, and 40 carried in the movable control sleeve 41 so as to provide intake ports 44 connected to the annular groove 42 formed in the spindle 28 which is in communication with the passageway 27 through the radial passageways 43 formed in the stem 28. Exhaust ports 45 opening through passageways 45a into the sump chamber 45b are also provided by the port forming collars. A return line 45c conveys exhausted fluid back to the reservoir 23. An intake and exhaust port 44 and 45 are each connected to a line 46 going to the chamber 47 of the cylinder 16 while the other intake and exhaust port of the valve 29 is connected through a line 48 to the chamber 49 of the cylinder 16 in such a way that with pressure being applied through the line 24 reciprocation of the valve sleeve 41 relative to the spindle 30 and its port forming collars 31 to 35, inclusive, provides a means for reversibly controlling and positioning accurately the piston 17 and cylinder 16 and therefore the tool slide 13 relative to the work piece to perform a form following or duplicating control movement for the cutting tool as it is fed along by the lathe carriage.

The control valve sleeve 41 of the valve 29 is controlled from pilot valve indicated generally at 50. This pilot valve is provided with a rotatable valve stem 51 which is journaled in a bearing 52 in the tool slide 13 and is guided against axial movement by the shoulder 53 of the valve stem and an adjustable collar 54 locked in adjusted position by a suitable set screw 55. This stem 51 is provided with a screw driver slot 56 or any other suitable means by which the stem may be rotated to a series of positions 56a such as shown in Figure 2. On the stem 51 is provided a series of port forming collars 57, 58, 59, 60, and 61 each locked in place against the other by means of an abutment collar 62 which is engaged by a closure plug 63 threaded at 64 into a cylinder bore 65 provided in the spindle 51. In the cylinder bore 65 is provided a piston 66 having a connecting rod 67 passing through a suitable guide bore in the plug 63 and bolted by suitable nut means 68 to a projecting arm 41a of the valve sleeve 41 of the valve 29 so that reciprocation of piston 66 by fluid pressure in the cylinder bore 65 effects adjustment of the sleeve 41 of the valve 29. Each of the inner port forming collars 57 to 61, inclusive, is formed as shown in Figure 5 so as to provide intake ports 69 and 70 and exhaust ports 71 and 72. Port 69 is in communication with the chamber 73 of the cylinder bore 65 through a passageway 74 while the exhaust port 71 is in communication through a passageway 75 with the chamber 73. Intake port 70 communicates through a passageway 76 with a chamber 77 in the cylinder 65 while exhaust port 72 communicates through a passageway 78 with the chamber 77 of the cylinder 65.

Each of the intake ports 69 and 70 and exhaust ports 71 and 72 is formed as narrow segmental peripheral slits formed by raised portions such as 79 provided on the collar members 58 and 60 and these raised portions 79 are of segmental character covering 90 degree arcuate portions, as best seen in Figure 6, around the periphery of the respective port forming collars.

Around the outside of the port forming collars 57 to 61, inclusive, just described, is a mating set of outside port forming collars 80, 81, 82, 83, and 84 as shown in detail in Figure 4. The collars 80, 82, and 84 are provided with segmental raised portions 85 located to cover 90 degree arcuate portions as best shown in Figure 6, forming slitted openings cooperating with the slits formed by the inner collars to form the ports 69, 70, 71, and 72. All of the port forming collars 80 to 84, inclusive, are locked securely to the pilot valve sleeve 86 by a suitable threaded clamping collar 87 securely binding all of these port forming collars against the shoulder 88 of the sleeve 86. In Figure 7 is clearly shown the construction of one of the port forming collars, such as the collar 82, having the arcuate segmental raised portions 85 formed thereon and having the cut away portions 89 provided to form the port in conjunction with the mating port forming collars 57 to 61, inclusive.

Fluid pressure is supplied to the intake ports 69 and 70 through the collars 81, 82, and 83 from the pressure supply line 90 suitably connected to the pressure supply line 24 as by connection with the pressure passageway 27 in the spindle 28. The line 90 is connected to the passageway 91 formed in a pressure supply spindle 92 for the pilot valve 50, this spindle nicely sliding in a suitable bore 93 formed in the pilot valve sleeve 86. An annular groove 94 communicating through radial passageways 95 with the pressure supply passageway 91 conducts fluid through passageways 96 in the valve sleeve 86 to the intake ports 69 and 70 formed between the respective collars 81, 82, and 83.

The pilot valve sleeve 86 may be actuated in accordance with the shape of a template by means of a template finger or stylus 97 mounted on a suitable pivot 98 carried on the tool slide 13 and having a tracer finger 99 engaging a template 100 fixed to the machine frame against longitudinal movement in any suitable manner but preferably in a way as shown in applications Serial No. 675,523 and Serial No. 743,669 indicated generally at 101 so as to relatively reciprocate the stylus tip 99 in conformity with the pattern 100 over which the tracer is caused to be traversed by the usual feeding movement of the lathe carriage. The tracer finger 97 has an abutment surface 102 engaging an actuating pin 103 fixed to the sleeve 86 of the pilot tracer valve 50 and a bias spring 104 engaging the enlarged head portion of the actuating pin 103 serves to normally move the tracer finger tip 99 toward the template and to bias the pilot valve sleeve 86 in a position to cause normal infeed movement of the cutting tool 15 toward the work piece in the machine.

Thus, in this way, actuation of the tracer finger 97 by the template 100 reciprocates the pilot valve sleeve 86 to vary the flow of fluid pressure to the chambers 73 and 77 of the cylinder bore 65 to cause the piston 66 therein to similarly move the sleeve 41 of the main control valve 29 which in turn controls the position of the piston 17 and the cylinder 16 for accurately positioning the tool slide 13 in tracer controlled motion. By this arrangement, maximum pressures and high volumes of flow may be readily handled through the main control valve 29 while the pilot tracer control valve 50 may be used to control the valve 29 while requiring a very light sensitive pressure of the tracer finger tip 99 on the template 100.

An important feature of the pilot valve 50 is that its porting may be varied to suit desired operating conditions of responsiveness and sensitiveness to control for different classes and types of work and for different sizes of cylinders to be operated by it. This is accomplished by rotating the valve stem 51 relative to the sleeve 86 by placing a screw driver in the slot 56 and turning the stem and its port forming collars 57, 58, 59, 60, and 61 fixed thereto to different relative peripheral positions with respect to the outer port forming collars 80, 81, 82, 83, and 84 so as to vary the size of the port openings between the two sets of port forming collars. This can best be seen by referring to Figure 6 in which there is shown the relative position of the valve stem 51 in a half-open position in which half of the areas of the ports formed by the collars is in operation. By turning the stem to the full opened position 1 shown in Figure 2, the maximum porting can be utilized for rapid control and maximum movements under the tracer control action of the template operating against a tracer finger tip. However, when it is desired to have a very minimum of movement and sensitiveness to the apparatus or a light cutting tool slide is being controlled, the valve porting may be turned to a position approaching the closed position 4, Figure 2, so as to in this way give a greater degree of sensitiveness and quickness of response to the control mechanism for operating the valve sleeve 41 in the valve 29 of the pilot valve 50.

There has thus been provided a pilot operated servo valve mechanism in which a primary valve for reversibly controlling the position of a machine member actuated by a fluid pressure cylinder is controlled by a pilot servo valve which is actuated directly from the template actuated stylus of the tracer mechanism. There has also been provided in a pilot valve controlled servo valve mechanism a means for varying the port openings to any desired value to vary the sensitiveness and rate of response of the pilot valve in controlling the main valve of the apparatus to meet all types of operating conditions.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having thus fully set forth and described this invention, what is claimed as new and desired to be secured by United States Letters Patent is:

1. In a pilot operated servo valve system having a primary valve, means connecting said valve to a fluid pressure motor adapted to actuate the machine element, intake and exhaust ports in said main valve and an adjustable sleeve movable to regulate said ports to vary the direction and position of movement of said fluid pressure motor, fluid pressure means for actuating said main valve sleeve including a piston and cylinder arrangement incorporated in a pilot valve having a stem, ports in said stem communicating with the chambers of said fluid pressure actuating cylinder, and an adjustable pilot valve sleeve having movement to vary the openings of the ports in said pilot valve to effect reversible and positional control of said valve sleeve of said main valve.

2. In a pilot operated servo valve system having a primary valve, means connecting said valve to a fluid pressure motor adapted to actuate the machine element, intake and exhaust ports in said main valve and an adjustable sleeve associated with said valve movable to regulate said ports to vary the direction and position of movement of said fluid pressure motor, fluid pressure means for actuating said main valve sleeve including a piston and cylinder arrangement incorporated in a pilot valve having a stem, ports in said stem communicating with the chambers of said fluid pressure actuating cylinder, an adjustable pilot valve sleeve having movement to vary the openings of the ports in said pilot valve to effect reversible and positional control of said valve sleeve of said main valve, and means for rotatably adjusting said pilot valve stem relative to said pilot valve sleeve to vary the openings of said ports between said stem and sleeve for varying the rate of response of said fluid pressure actuating cylinder to the actuation of said pilot valve sleeve.

3. In a pilot operated servo valve system having a primary valve, means connecting said valve to a fluid pressure motor adapted to actuate the machine element, intake and exhaust ports in said main valve and an adjustable sleeve associated with said valve movable to regulate said ports to vary the direction and position of movement of said fluid pressure motor, fluid pressure means for actuating said main valve sleeve including a piston and cylinder arrangement incorporated in a pilot valve having a stem, ports in said stem communicating with the chambers of said fluid pressure actuating cylinder, an adjustable pilot valve sleeve having movement to vary the openings of the ports in said pilot valve to effect reversible and positional control of said fluid pressure actuating cylinder for similarly controlling the valve sleeve of said main valve, means for relatively rotatably adjusting said pilot valve stem and said pilot valve sleeve to vary the openings of said ports between said stem and sleeve for varying the rate of response of said fluid pressure actuating cylinder to the actuation of said pilot valve sleeve, and tracer finger control means operably engaging a template for regulating the position of said pilot valve sleeve to effect a template controlled operation of said fluid pressure motor.

4. In a pilot controlled servo valve system, adapted to actuate a fluid pressure motor, a main valve stem connected to each side of said fluid pressure motor, an adjustable valve sleeve axially slidable on said valve stem in ported relationship therewith, and fluid pressure means connected to said valve sleeve for reversibly and variably applying fluid pressure from a source thereof to control the operation of said motor cylinder, a pilot valve having a valve stem, a valve sleeve axially slidable on said valve stem having ported inter connection therewith, a source of fluid pressure connected into said sleeve, and a fluid pressure cylinder controlled by said flow through said pilot valve, and means connecting said second mentioned fluid pressure cylinder to actuate the valve sleeve of said main valve.

5. In a pilot controlled servo valve system, adapted to actuate a fluid pressure motor, a main valve stem connected to each side of said fluid pressure motor, an adjustable valve sleeve axially slidable on said valve stem in ported relationship therewith, and fluid pressure means connected to said valve sleeve for reversibly and variably applying fluid pressure from a source thereof to control the operation of said motor cylinder, a pilot valve having a valve stem, a valve sleeve axially slidable on said valve stem having ported inner relationship therewith, a source of fluid pressure connected into said sleeve, and a fluid pressure cylinder controlled by said flow through said pilot valve, means connecting said second mentioned fluid pressure cylinder to actuate the valve sleeve of said main valve, and means for relatively rotatably adjusting said pilot valve stem relative to said sleeve to change the port openings of said valve to vary the rate of flow of fluid pressure to said second mentioned cylinder for actuating the main valve sleeve.

6. In a pilot operated servo mechanism for a duplicator attachment for lathe having an actuating cylinder with a reciprocatable piston rod therein, a main control valve having a valve stem with ports formed thereon, a control sleeve for said valve axially slidable on said valve stem having mating ports therein, means for applying fluid pressure to said sleeve to cause controlled pressure flow through said porting between said valve sleeve and said valve stem, and means for connecting fluid pressure from the ports in said valve stem to said cylinder, a pilot valve associated with said first mentioned valve comprising a rotatable valve stem having ported means therein, a pilot valve sleeve slidable axially on said valve stem having associated porting therein, means for connecting fluid pressure to said valve sleeve and said ports, and a control cylinder connected to said pilot valve by fluid pressure conducting means and mechanically connected to said valve sleeve of said first mentioned valve so that relative adjustment of said pilot valve sleeve effects similar adjustment of the valve sleeve of said first mentioned valve to control the operation of the piston rod of said cylinder for actuating said tool slide.

7. In a pilot operated servo mechanism for duplicator attachment for lathe having an actuating cylinder a reciprocatable piston rod therein, a main control valve having a valve stem with ports formed thereon, a reciprocatable control sleeve for said valve axially slidable on said valve stem having mating ports therein, means for applying fluid pressure to said sleeve to cause controlled pressure flow through said porting between said valve sleeve and said valve stem, and means for connecting fluid pressure from the ports in said valve stem to said cylinder, a pilot valve associated with said first mentioned valve comprising a rotatable valve stem having ported means therein, a pilot valve sleeve slidable axially on said valve stem having associated porting therein, means for connecting fluid pressure to said valve sleeve and said ports, and a control cylinder connected to said pilot valve by fluid pressure conducting means and mechanically connected to said valve sleeve of said first mentioned valve so that relative adjustment of said pilot valve sleeve effects similar adjustment of the valve sleeve of said first mentioned valve to control the operation of said piston rod in said cylinder, and tracer finger actuating means for the valve sleeve of said pilot valve.

8. In a pilot operated servo mechanism for duplicator attachment for lathe having an actuating cylinder with a piston rod reciprocatable therein, a main control valve having a valve stem with ports formed thereon, a control sleeve for said valve axially slidable on said valve stem having mating ports therein, means for applying fluid pressure to said sleeve to cause controlled pressure flow through said porting between said valve sleeve and said valve stem, and means for connecting fluid pressure from the ports in said valve stem to said cylinder, a pilot valve associated with said first mentioned rotatable valve comprising a valve stem having ported means therein, a pilot valve sleeve slidably axially on said valve stem having associated porting therein, means for connecting fluid pressure to said valve sleeve and said ports, and a control cylinder connected to said pilot valve by fluid pressure conducting means and mechanically connected to said valve sleeve of said first mentioned valve so that relative adjustment of said pilot valve sleeve effects similar adjustment of the valve sleeve of said first mentioned valve to control the operation of the piston rod in said cylinder, and tracer finger actuating means for the valve sleeve of said pilot valve, said control cylinder being incorporated in said valve stem of said pilot valve and connected directly to the porting of said valve through said valve stem.

9. In a pilot operated servo mechanism for duplicator attachment for lathe having an actuating cylinder with a piston rod reciprocatable therein, a main control valve having a valve stem with ports formed thereon, a control sleeve for said valve axially slidable on said valve stem having mating ports therein, means for applying fluid pressure to said sleeve to cause controlled pressure flow through said porting between said valve sleeve and said valve stem, and means for connecting fluid pressure from the ports in said valve stem to said cylinder, a pilot valve associated with said first mentioned valve comprising a rotatable valve stem having ported means therein, a pilot valve sleeve slidably axially on said valve stem having associated porting therein, means for connecting fluid pressure to said valve sleeve and said ports, and a control cylinder connected to said pilot valve by fluid pressure conducting means and mechanically connected to said valve sleeve of said first mentioned valve so that relative adjustment of said pilot valve sleeve effects similar adjustment of the valve sleeve of said first mentioned valve to control the operation the piston rod of said cylinder, and tracer finger actuating means for the valve sleeve of said pilot valve, said control cylinder being incorporated in said valve stem of said pilot valve and connected directly to the porting in said valve stem, and means for rotating said pilot valve stem relative to said sleeve to vary the size of the porting between said stem and said sleeve of said pilot for varying the rate of flow to said control cylinder.

ARTHUR P. WATERSON.

REFERENCES CITED

The following references are of record in the file of this patent:

UNITED STATES PATENTS

| Number | Name | Date |
|--------|------|------|
| 471,870 | Lepley | Mar. 29, 1892 |
| 1,893,246 | Robertson | Jan. 3, 1933 |
| 2,212,871 | Wood | Aug. 27, 1940 |
| 2,437,570 | Von Zelewsky | Mar. 9, 1948 |

FOREIGN PATENTS

| Number | Country | Date |
|--------|---------|------|
| 342,463 | Germany | Oct. 18, 1921 |